U S010954015B2

(12) United States Patent
Wierenga et al.

(10) Patent No.: US 10,954,015 B2
(45) Date of Patent: Mar. 23, 2021

(54) EXPANDABLE GRAIN BAGGING APPARATUS AND METHOD THEREOF

(71) Applicant: Neeralta Manufacturing Inc., County of Barrhead (CA)

(72) Inventors: John Marvin Wierenga, County of Barrhead (CA); Bryan Richard Vander Leest, Neerlandia (CA); Lambert Klass Wierenga, Barrhead (CA)

(73) Assignee: Neeralta Manufacturing Inc., County of Barrhead (CA)

( * ) Notice: Subject to any disclaimer, the term of this patent is extended or adjusted under 35 U.S.C. 154(b) by 0 days.

(21) Appl. No.: 16/525,896

(22) Filed: Jul. 30, 2019

(65) Prior Publication Data

US 2020/0115083 A1 Apr. 16, 2020

Related U.S. Application Data

(60) Provisional application No. 62/746,130, filed on Oct. 16, 2018.

(51) Int. Cl.
*B65B 43/54* (2006.01)
*B65B 25/02* (2006.01)
(Continued)

(52) U.S. Cl.
CPC .............. *B65B 43/54* (2013.01); *A01F 12/50* (2013.01); *B65B 1/06* (2013.01); *B65B 25/02* (2013.01); *A01F 25/14* (2013.01)

(58) Field of Classification Search
CPC . B65B 43/54; B65B 1/06; B65B 25/02; A01F 12/44; A01F 12/442; A01F 12/444; A01F 12/446; A01F 12/448; A01F 12/46; A01F 12/60; A01F 25/14; A01F 12/42; A01D 41/1208; A01D 41/1217; A01D 41/1226; A01D 41/1272; A01D 41/1273; A01D 41/1275; A01D 41/1277; A01D 51/007; A01D 65/00; A01D 65/02;
(Continued)

(56) References Cited

U.S. PATENT DOCUMENTS

| 5,419,102 A * | 5/1995 | Inman | A01F 25/14 53/257 |
| 6,907,714 B2 * | 6/2005 | Cullen | A01F 25/14 53/530 |
| 2016/0039545 A1 * | 2/2016 | Stumpe | B65B 39/08 141/275 |

* cited by examiner

*Primary Examiner* — Timothy P. Kelly
*Assistant Examiner* — Christopher M Afful
(74) *Attorney, Agent, or Firm* — Brion Raffoul

(57) ABSTRACT

The present invention relates to devices and methods for loading grain into a grain bag using a grain bagging apparatus that can expand and contract to accommodate different grain bag sizes. The apparatus is comprised of an expandable grain discharge tunnel. This expandable tunnel comprises a stationary section and a flanking side. The flanking side can expand in an outwardly direction away from the stationary section to increase the overall width of the grain discharge tunnel such that differently sized grain bags can be utilized with a single grain bagging apparatus. The flanking side can be slid in an inwardly direction towards the stationary section into a first position for use with smaller grain bags. In the first position, the apparatus is easier to transport or store. The grain bag can be loaded onto the grain bagging apparatus in a first position and then the expandable grain discharge tunnel can be expanded into the second position.

25 Claims, 8 Drawing Sheets

(51) Int. Cl.
 *B65B 1/06* (2006.01)
 *A01F 12/50* (2006.01)
 *A01F 25/14* (2006.01)
(58) Field of Classification Search
 CPC ........ A01D 65/04; A01D 65/06; A01D 65/08;
 A01D 75/02; A01D 75/282
 See application file for complete search history.

EXPANDABLE GRAIN BAGGING APPARATUS AND METHOD THEREOF

RELATED APPLICATIONS

This application is a non provisional patent application which claims the benefit of U.S. provisional application No. 62/746,130 filed on Oct. 16, 2018.

TECHNICAL FIELD

The present invention relates to grain bags. More specifically, the present invention relates to a grain bag loading machine.

BACKGROUND

Grain production in the agriculture industry is expanding to feed the world's population. Single farming operations are increasingly producing more and more grain products. Accordingly, convenient grain storage methods are required to store the grain products.

Use of grain bags or grain sleeves for storing grains, such as cereal grains, seeds, oilseeds, pulses, and legumes is becoming standard practice. The grain bags are transported as large rolls of flexible material, such as plastic, in which the grain can be stored during the winter months.

The grain is loaded into these grain bags using grain bagging machines. The bags are then sealed for storage. One problem with the grain bagging system is that there are multiple sizes of grain bags—ranging from 9 to 12 feet in diameter. Accordingly, the grain bagging machines used to load these grain bags must have grain discharge tunnels with widths that accommodate grain bags that range from 9 feet to 12 feet in diameter. Currently, for a grain farming operation to utilize the various sizes of grain bags, multiple grain bagging machines are required—one for each size of desired grain bag. However, the same grain farming operation may have various field or crop sizes that require different grain bag sizes for storage.

Furthermore, to utilize the larger grain bag sizes, such as 12-foot bags, the required grain bagging machine must also be the same width of the bags. Transportation of a wider machine can be more difficult for the operator and dangerous to the public when traveling on roads and highways. Additionally, storage of larger grain bagging machines can be cumbersome for the operator, especially if multiple size machines are required for a single grain operation.

Based on the above, there is therefore a need for methods, devices, and systems which mitigate, if not overcome, the problems with the prior art.

SUMMARY

The present invention provides devices and methods for loading grain into a grain bag using a grain bagging apparatus that can expand and contract to accommodate different grain bag sizes. The apparatus is comprised of an expandable grain discharge tunnel. This expandable tunnel comprises a stationary section and a flanking side. The flanking side can expand in an outwardly direction away from the stationary section to increase the overall width of the grain discharge tunnel such that differently sized grain bags can be utilized with a single grain bagging apparatus. The flanking side can be slid in an inwardly direction towards the stationary section into a first position for use with smaller grain bags. In the first position, the apparatus is easier to transport or store. To simplify installation, the grain bag can be loaded onto the grain bagging apparatus in the first position and then the expandable grain discharge tunnel can be expanded into the second position.

In a first aspect, the present invention provides an expandable grain discharge tunnel for a grain bagging apparatus, the expandable grain discharge tunnel comprising: a stationary section; a first flank slidably coupled to the stationary section; and a first drive means having a first end and a second end, the first end of the first drive means is coupled to the first flank and the second end of the drive means is coupled to the stationary section; wherein the first drive means is for sliding the first flank in an outwardly direction away from the stationary section to move the expandable grain discharge tunnel from a first position to a second position and the drive means is for sliding the first flank in an inwardly direction towards the stationary section to move the expandable grain discharge tunnel from the second position to the first position; and the expandable grain discharge tunnel is configured to accommodate at least two sizes of grain bags, such that the first position and the second position of the expandable grain discharge tunnel are each configured to couple with one of the at least two sizes of grain bags.

In a second aspect, the present invention provides a grain bagging apparatus for loading grain into a grain bag for storage, the grain bagging apparatus comprising an expandable grain discharge tunnel having: a stationary section; a first flank slidably coupled to the stationary section; and a first drive means having a first end and a second end, the first end of the first drive means is coupled to the first flank and the second end of the drive means is coupled to the stationary section; wherein the first drive means is for sliding the first flank in an outwardly direction away from the stationary section to move the expandable grain discharge tunnel from a first position to a second position and the drive means is for sliding the first flank in an inwardly direction towards the stationary section to move the expandable grain discharge tunnel from the second position to the first position; and the expandable grain discharge tunnel is configured to accommodate at least two sizes of grain bags, such that the first position and the second position of the expandable grain discharge tunnel are each configured to couple with one of the at least two sizes of grain bags.

In a third aspect, the present invention provides a method of loading a grain bag on a grain bagging apparatus having an expandable grain discharge tunnel, the method comprising the steps of: providing the grain bagging apparatus having the expandable grain discharge tunnel, the expandable grain discharge tunnel is capable of being in a first position and a second position and a width of the expandable grain discharge tunnel is smaller in the first position than in the second position; positioning the grain bag on the expandable grain discharge tunnel while the tunnel is in the first position; and moving the expandable grain discharge tunnel from the first position to the second position.

In a further aspect, this document discloses an expandable grain discharge tunnel for a grain bagging apparatus, the expandable grain discharge tunnel comprising: a stationary section; a first flank slidably coupled to the stationary section; and a first drive means having a first end and a second end, the first end of the first drive means being coupled to the first flank and the second end of the drive means being coupled to the stationary section; wherein the first drive means slidably transitions the expandable grain discharge tunnel from a first position to a second position by sliding the first flank in an outward direction away from the stationary section along a rectilinear path and the first drive means slidably transitions the expandable grain discharge tunnel from the second position to the first position by sliding the first flank in an inward direction towards the stationary section along the rectilinear path; wherein the expandable grain discharge tunnel has a wider width in the second position than in the first position, such that differently sized grain bags are mountable with the grain discharge tunnel when the grain discharge tunnel is in different positions.

In still a further aspect, this document discloses a grain bagging apparatus for loading grain into a grain bag for storage, the grain bagging apparatus comprising an expandable grain discharge tunnel having: a stationary section; a first flank slidably coupled to the stationary section; and a first drive means having a first end and a second end, the first end of the first drive means being coupled to the first flank and the second end of the drive means being coupled to the stationary section; wherein the first drive means slidably transitions the expandable grain discharge tunnel from a first position to a second position by sliding the first flank in an outward direction away from the stationary section along a rectilinear path and the first drive means slidably transitions the expandable grain discharge tunnel from the second position to the first position by sliding the first flank in an inward direction towards the stationary section along the rectilinear path; wherein the expandable grain discharge tunnel has a wider width in the second position than in the first position such that differently sized grain bags are mountable on the grain discharge tunnel.

In another aspect, this document discloses a method of loading a grain bag on a grain bagging apparatus having an expandable grain discharge tunnel, the method comprising the steps of: providing the grain bagging apparatus, the grain bagging apparatus having the expandable grain discharge tunnel, the expandable grain discharge tunnel having a stationary section and at least one flank and the expandable grain discharge tunnel being configured to have a first position and a second position and the expandable grain discharge tunnel being configured to slidably transition from the first position to the second position by sliding the at least one flank in an outward direction away from the stationary section along a rectilinear path, the grain discharge tunnel having a larger width in the second position than in the first position; securing the grain bag on the expandable grain discharge tunnel while the tunnel is in the first position; and slidably transitioning the expandable grain discharge tunnel from the first position to the second position along the rectilinear path to thereby secure the grain bag around an outer perimeter of the expandable grain discharge tunnel.

BRIEF DESCRIPTION OF THE DRAWINGS

The present invention will now be described by reference to the following figures, in which identical reference numerals refer to identical elements and in which.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical contact with each other. "Coupled" may be used to indicated that two or more elements are in either direct or indirect (with other intervening elements between them) physical contact with each other, or that the two or more elements co-operate or interact with each other (e.g. as in a cause and effect relationship).

Figure 1:
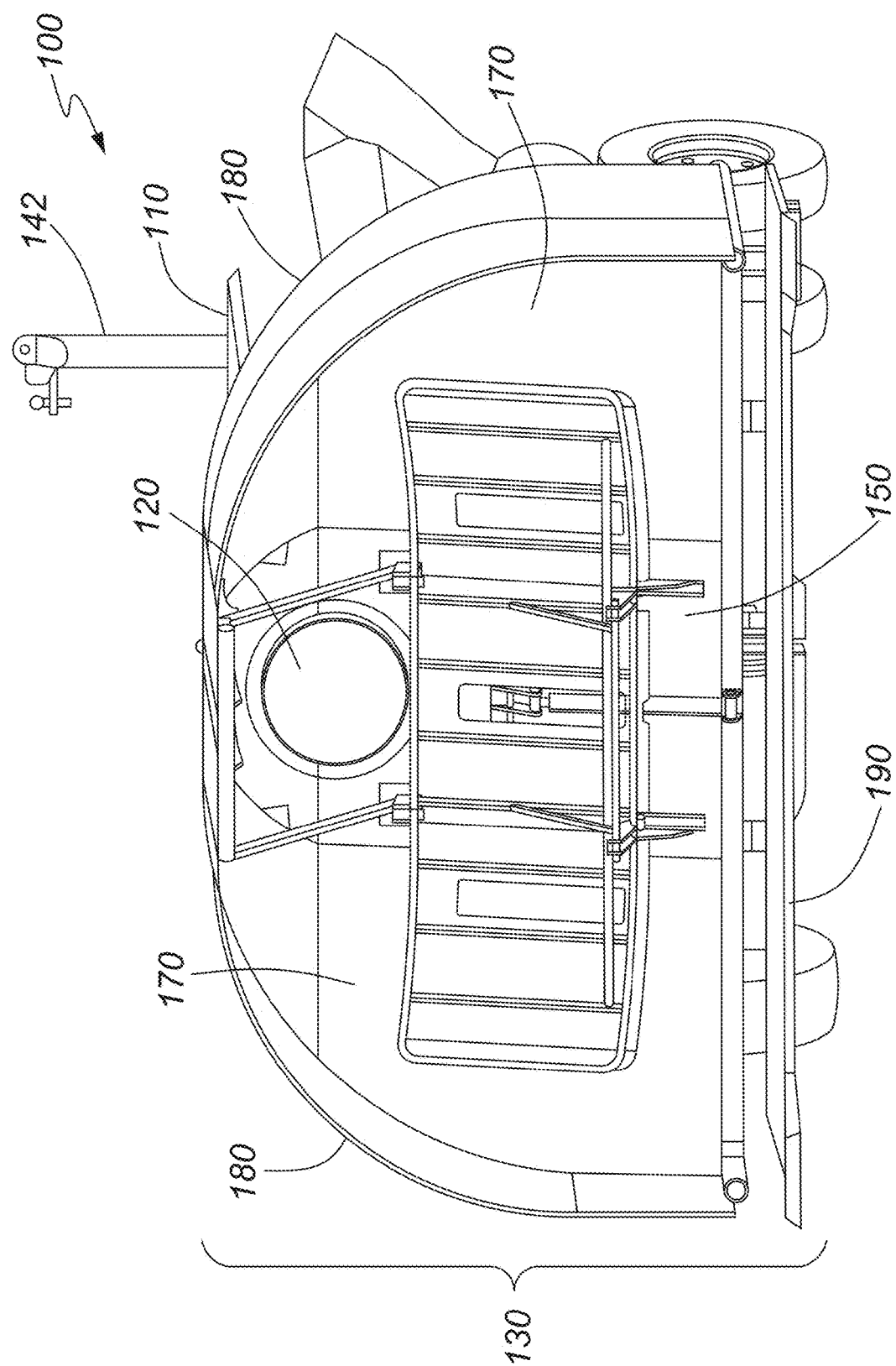
FIG. 1 is a rear perspective view of a grain bagging apparatus in a first position according to one aspect of the invention.

Referring now to FIG. 1, the rear side (i.e., the side where the grain is being loaded into the grain bag) of a grain bagging apparatus 100 in a first position is shown. The grain bagging apparatus 100 comprises an inlet 110, a conduit 115, an outlet 120, an expandable grain discharge tunnel 130, and a mobile chassis 140. The grain bagging apparatus 100 is in a first position when the expandable grain discharge tunnel 130 has not been expanded outwardly to have a larger width (i.e., the grain discharge tunnel 130 is in a first position).

The expandable grain discharge tunnel 130 in the first position is for accommodating and bagging grain in smaller grain bags. Additionally, the grain bagging apparatus 100 is easier to transport or store in the first position. The expandable grain discharge tunnel 130 can then be expanded outwardly into a second position. The width of the expandable grain discharge tunnel 130 is larger in the second position than in the first position. Accordingly, the expandable grain discharge tunnel 130 in the second position is for accommodating and bagging grain in larger grain bags. The second position may be the fully expanded position (i.e., the flanking sides being moved outwardly from the stationary section to the flanking side's fullest extent). Alternatively, the second position may be a mid-way position such that the width of the expandable grain discharge tunnel 130 can be further expanded (i.e., the flanking side(s) can move further away from the stationary section in an outwardly direction) into additional positions. Accordingly, the grain bagging apparatus 100 may accommodate more than two (2) sizes of grain bags.

A grain bag that is folded in an accordion-like fashion is loaded onto the expandable grain discharge tunnel 130. The grain bag is then secured to the expandable grain discharge tunnel 130. Once secured to the expandable grain discharge tunnel 130, the grain bag is sealed at one end. Grain is then deposited into the inlet 110, flows through the conduit 115 to the outlet 120. The conduit 115 is coupled to the expandable grain discharge tunnel 130 at the outlet 120 such that the grain flows out the outlet 120 and into the grain bag.

As the grain is being fed into the grain bag, the grain bagging apparatus 100 moves away from the sealed end of the grain bag on the mobile chassis 140 as the pressure from the grain loaded into the grain bag pushes on the back shield and moves the grain bagging apparatus 100 forward along with the neutral geared power source (i.e., the mover in neutral). The movement of the grain bagging apparatus 100 away from the sealed end allows the bottom of the grain bag to remain stationary on the ground and facilitates uniform loading of the grain into the grain bag.

Figure 3:
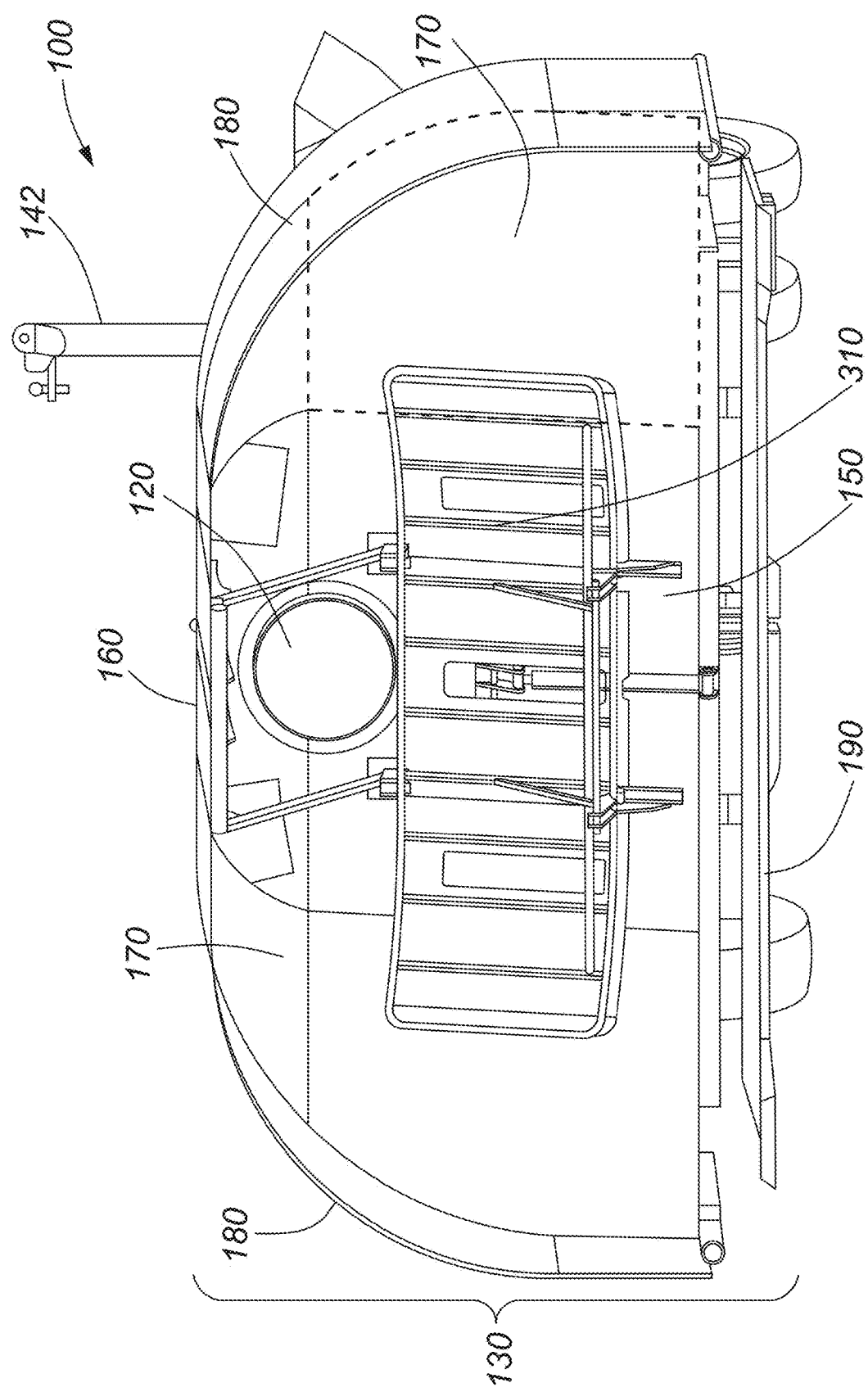
FIG. 3 is a rear perspective view of a grain bagging apparatus in a second position according to one aspect of the invention.

The main body of the expandable grain discharge tunnel 130 is comprised of a stationary shield 150 coupled to a stationary plate 160 (as shown in FIG. 3) and two (2) flanking shields 170, each coupled to a flanking frame 180. The stationary shield 150 and stationary plate 160 collectively form a stationary section. The left flanking shield 170 and the left flanking frame 180 sections collectively form a first flank. Similarly, the right flanking shield 170 and the right flanking frame 180 collectively form a second flank. In operation, the width of the expandable grain discharge tunnel 130 increases when the first flank and/or the second flank moves in an outwardly direction away from the stationary section (i.e., moves from the first position to the second position). Similarly, the width of the expandable grain discharge tunnel 130 decreases when the first flank and/or the second flank moves in an inwardly direction toward the stationary section (i.e., moves from the second position to the first position).

An expandable loading tray 190 may be coupled to the bottom edge of the stationary shield 150 and/or the flanking shields 170 to assist in securing the grain bag to the expandable grain discharge tunnel 130. Similarly to the stationary section and flanking sides, the expandable loading tray 190 has flanking portions that are slidably coupled to a stationary portion. When the expandable grain discharge tunnel 130 moves from the first position to additional positions (i.e., second, third, fourth, etc. positions), the flanking portions of the expandable loading tray 190 in an outwardly direction also move in an outwardly direction from the stationary portion to increase the width of the expandable loading tray 190. The width of the expandable loading tray 190 expands to be approximately equal to the width of the expandable grain discharge tunnel 130 in the additional position.

In a further embodiment, a rubber flap may be coupled to the bottom edge of the stationary shield 150 and/or the flanking shields 170. The rubber flap prevents grain from pouring into the unused portion of the grain bag, when the grain bag is being loaded into the grain bag.

The conduit 115 is coupled to the stationary shield 150 at the outlet 120, such that the grain is loaded near the center of the expandable grain discharge tunnel 130. However, the expandable grain discharge tunnel 130 could be offset to either side of the conduit 115 such that the conduit 115 is coupled to either of the flanking shields 170. The stationary shield 150 and the flanking shields 170 collectively form a back shield of the expandable grain discharge tunnel 130 to ensure that the grain exiting the outlet 120 moves in the direction of the grain bag.

Figure 5:
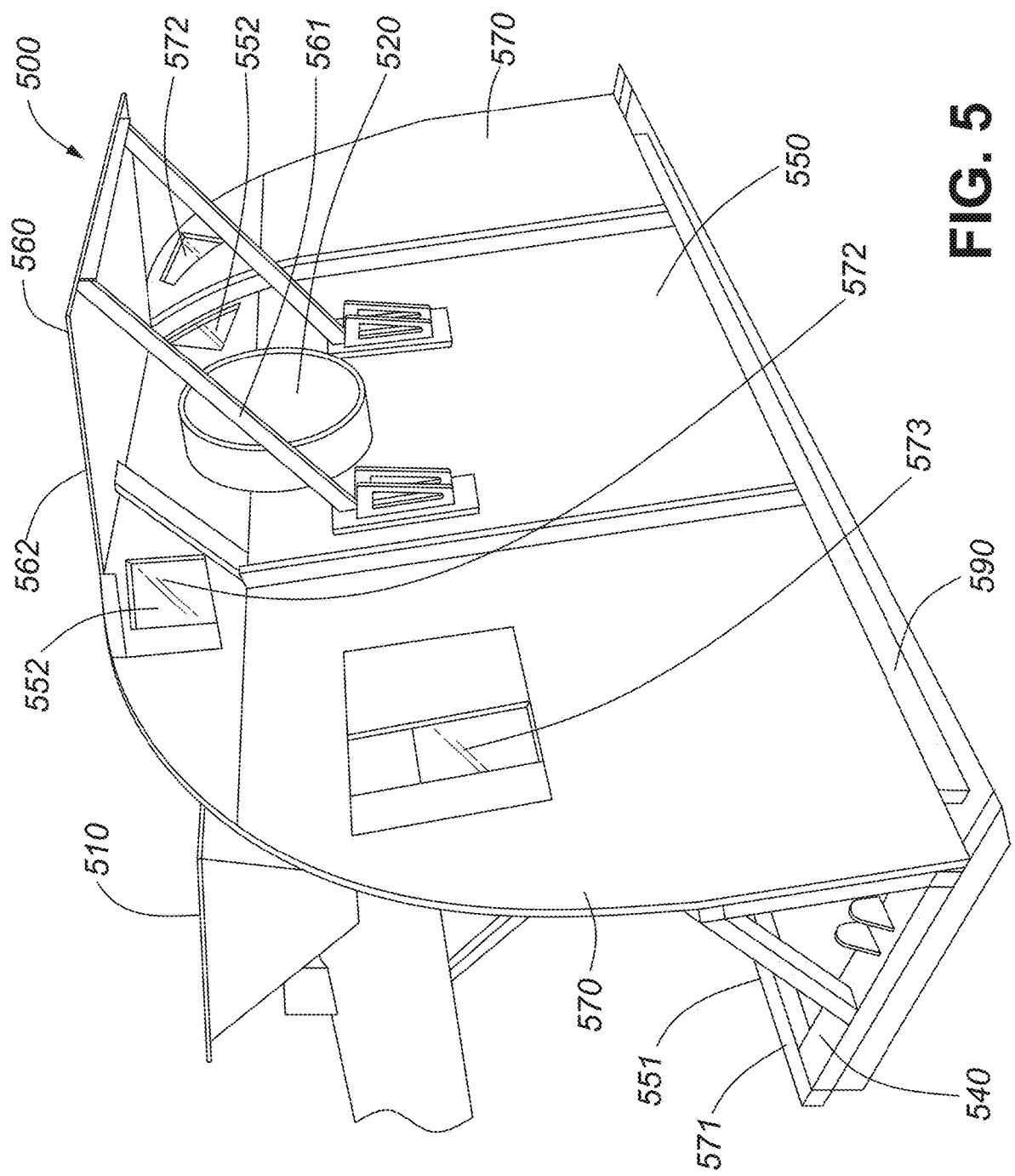
FIG. 5 is a rear perspective view of a portion of a grain bagging apparatus in a second position according to another aspect of the invention.
Figure 6:
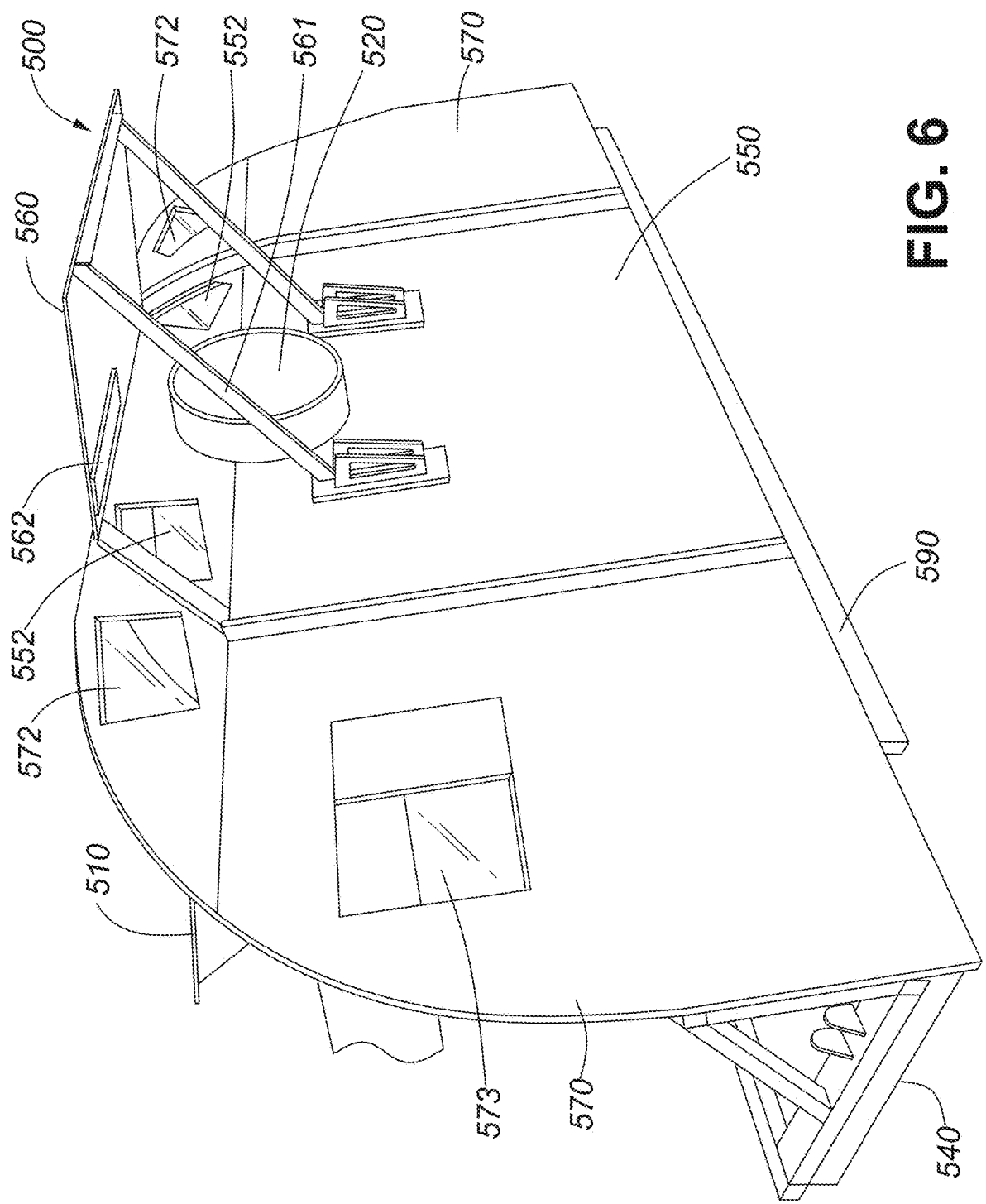
FIG. 6 is a rear perspective view of the portion of the grain bagging apparatus illustrated in FIG. 5 in a third position.

The stationary shield 150 may be coupled perpendicular or near perpendicular to the stationary plate 160 at any point along the bottom side of the stationary plate 160. In a preferred embodiment, the stationary plate 160 is coupled to the stationary shield 150 on the front side end of the stationary plate 160 (as shown in FIGS. 5 and 6).

Similarly, each of the flanking shields 170 may be coupled perpendicular to or near perpendicular to each flanking frame 180 at any point along the bottom side of the flanking frame 180. In a referred embodiment, the flanking frames 180 are each coupled to their respective flanking shield 170 on the front side end of the flanking frames 180.

At least one of the flanking sides (i.e., a flanking shield 170 coupled to a flanking frame 180) is slidably coupled to the stationary section (i.e., the stationary shield 150 and the stationary plate 160), such that the flanking side(s) can slide outwardly from the stationary section to expand the outer perimeter of the expandable grain discharge tunnel 130 into the second position. The width of the stationary section is such that the edge of the flanking side adjacent to the stationary section is still overlapping with the stationary section when in the fully expanded position. This overlap in the fully expanded position allows the stationary shield 150 to support the flanking shields 170 when pressure is applied against the back shield from the grain being discharged from the outlet 120. Accordingly, there should not be an opening between the stationary section and the flanking sides when the expandable grain discharge tunnel 130 is in the fully expanded position. Accordingly, in the first position, there is a significant overlap between the slidable flanking side(s) and the stationary section.

In an embodiment where only one flanking frame 180 is slidably coupled to the stationary plate 160, the other flanking frame 180 may be coupled to a side, top or bottom of the stationary plate 160. Similarly, where only one flanking shield 170 is slidably coupled to the stationary shield 150, the other flanking shield 170 may be coupled to the front or rear side of the stationary shield 150.

Embodiments where only one flanking side is slidably coupled to the stationary section are discussed herein. However, to allow for an even distribution of grain flowing into the grain bag, the outlet 120 is preferably in the center of the expandable grain discharge tunnel 130, when the expandable grain discharge tunnel 130 is in any position. Accordingly, for optimal results, the preferred embodiment has both flanking sides slidably coupled to the stationary section. An even distribution of grain is thus achieved by having both flanking sides move in an outwardly direction away from the stationary section an equal amount while the outlet 120 remains stationary. When only one flanking side moves, the outlet 120 remaining in the center of the expandable grain discharge tunnel 130 in an expanded position can be achieved by having the conduit 115 (and thus the outlet 120) move a portion of the distance with the flanking side. Alternatively, an even distribution of grain can be achieved by diverting the grain from the outlet 120 to the center of the expandable grain discharge tunnel 130, when the expandable grain discharge tunnel 130 is in an expanded position.

In FIG. 1, the flanking shields 170 are slidably coupled to the rear side of the stationary shield 150 and the flanking frames 180 are slidably coupled to the top of the stationary plate 160. Accordingly, there is a slit or gap 562 (as shown in FIG. 6) in the stationary plate 160 for the flanking shields 170 to fit through and to couple to the flanking frames 180. In this embodiment, the slit or gap 562 is a space on either side of the coupling point between the stationary shield 150 and the stationary plate 160. The slit or gap 562 allows for a maximum overlap of the flanking shields 170 on the rear side of the stationary shield 150, without the flanking shields' 160 movement being impeded by the stationary plate 160.

However, in another embodiment, the flanking shields 170 may be slidably coupled to the front side of the stationary shield 150 and the flanking frames 180 may be slidably coupled to the bottom of the stationary plate 160. A slit or gap 562 would not be necessary if the flanking shield 170 was coupled to the front side of the stationary shield 150 and if the flanking frame 180 was coupled on the top side of the stationary plate 160. Similarly, a slit or gap 562 would not be necessary if the flanking shield 170 was coupled to the rear side of the stationary shield 150 and if the flanking frame 180 was coupled on the bottom side of the stationary plate 160.

Figure 2:
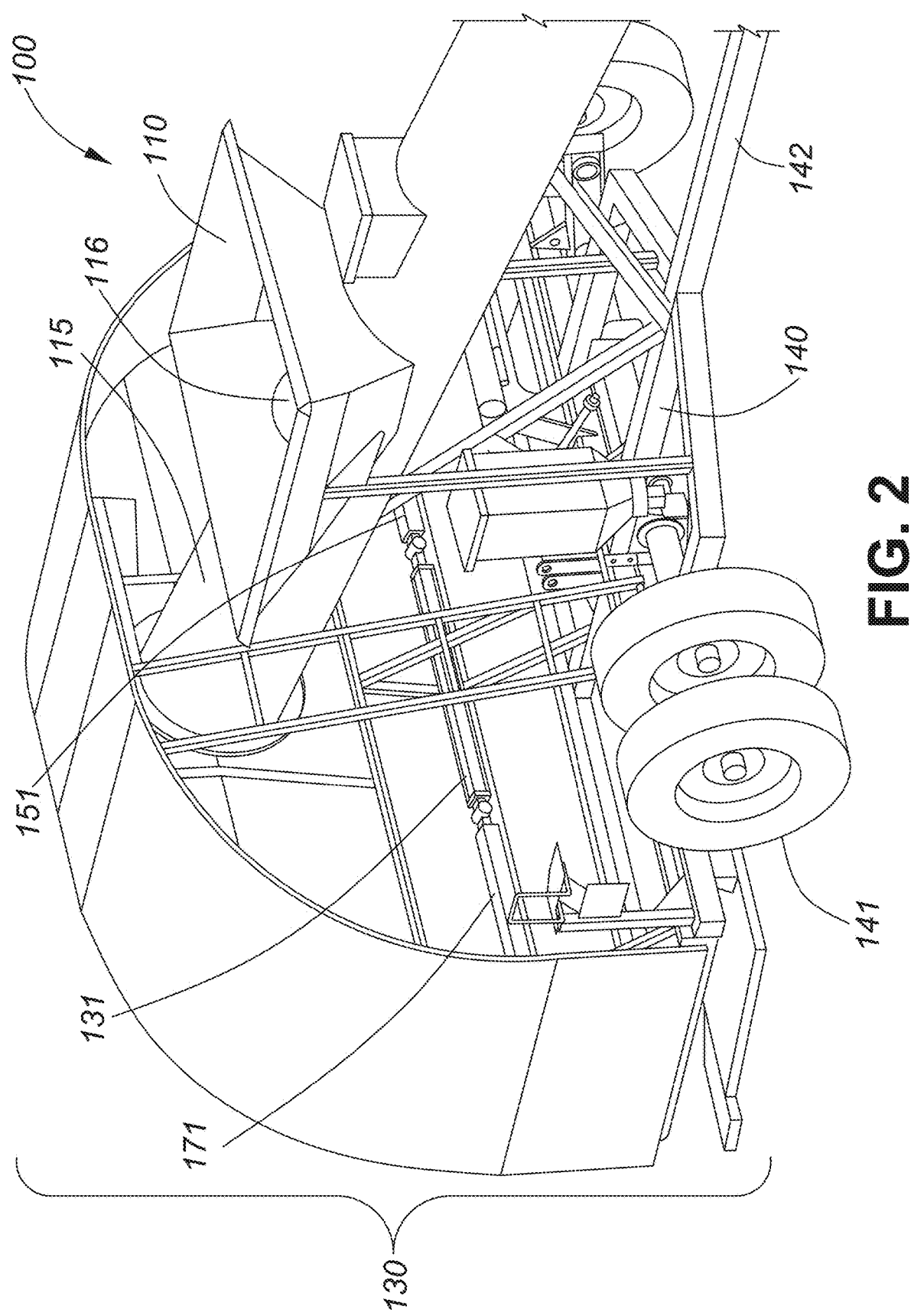
FIG. 2 is a front perspective view of a grain bagging apparatus in a first position according to one aspect of the invention.

Referring now to FIG. 2, the front side (i.e., the side facing away from the grain being loaded into the grain bag) of the grain bagging apparatus 100 in the first position is shown.

As can be seen, the inlet 110 is for receiving the grain and is coupled to the conduit 115 such that the grain, when deposited in the inlet 110, flows through the conduit 115 to the outlet 120. A funnel may be coupled to the inlet 110, as shown in FIG. 2, for ease of depositing grain. A wider funnel allows for easier unloading of the grain transporting machine, such as a grain cart, chaser bin, or auger wagon, into the inlet 110 while the grain bagging apparatus 100 is moving. However, the inlet 110 may also be an opening in the conduit 115 without a funnel. The inlet 110 or funnel may also have a roll tarp cover coupled adjacent to the inlet 110 or funnel, respectively, to cover the inlet 110 or funnel when the grain bagging apparatus 100 is not in use. A roll tarp cover protects the inlet 110 or funnel and prevents moisture from entering the conduit 115.

The conduit 115 may be a pipe, tube, or other suitable means that facilitates the movement of the grain from the inlet 110 to the expandable grain discharge tunnel 130. The conduit 115 is coupled to the expandable grain discharge tunnel 130 at the outlet 120. The conduit 115 may be inclined in a manner such that the grain pours directly from the inlet 110, through the conduit 115 and out the outlet 120 to the expandable grain discharge tunnel 130. However, to facilitate proper and consistent movement of the grain while loading the grain bag, a power actuated means 116 of moving the grain may be used, such as an auger or a conveyor belt. The power actuated means 116 may be powered by an engine or battery on the grain bagging apparatus 100 or may be powered by the mover used to move the grain bagging apparatus 100 (such as through a drive shaft or power take-off (PTO)).

To facilitate the movement of the expandable grain discharge tunnel 130 from the first position to the second position, and vice versa, the stationary shield 150 and the flanking shields 170 may be coupled to a stationary framework 151 and a slidable framework 171, respectively, on the front side of the expandable grain discharge tunnel 130. When both flanking sides (i.e., a flanking shield 170 and a flanking frame 180) are slidably coupled on either side of the stationary section (i.e., the stationary shield 150 and the stationary plate 160), the slidable frameworks 171 are slidably coupled to either side of the stationary framework 151. A drive means 131 is coupled to a stationary framework 151 at one end and to the slidable framework 171 at the other end. When the drive means 131 is actuated, the slidable framework 171 can move towards or away from the stationary framework 151 (i.e., inwardly or outwardly with respect to a center of the expandable grain discharge tunnel 130) such that the expandable grain discharge tunnel 130 is moved into either the first position or the second position, respectively.

Similarly, the expandable loading tray 190 has a stationary portion that is coupled to the stationary shield 150 and/or the stationary framework 151. The stationary portion is slidably coupled on either side to flanking portions such that the flanking portions can move towards or away from the stationary portion (i.e., inwardly or outwardly with respect to a center of the expandable loading tray 190). The flanking portions may be coupled to their respective flanking shield 170 and/or slidable framework 171, such that when the drive means 131 moves a flanking shield from the first position to the second position, the respective flanking portion also moves from the first position to the second position. Accordingly, the width of the expandable loading tray 190 can be expanded to have substantially the same width as the expandable grain discharge tunnel 130 when in the second position. When only one flanking side is slidably coupled to the stationary section, the flanking portion of the expandable loading tray 190 would be slidably coupled to the stationary portion of the expandable loading tray 190 on the same side that the sliding flanking side is slidably coupled to the stationary section.

The flanking portions of the expandable loading tray 190 may have vertical guide plates coupled to their outer edges (i.e., vertical guide plates on the outer edges of the expandable loading tray 190). These vertical guide plates help shape the grain bag around the expandable grain discharge tunnel 130. The expandable grain discharge tunnel 130 is coupled to or mounted onto the mobile chassis 140, such that the grain bagging apparatus 100 can move forward when being used to bag grain. The mobile chassis 140 may have wheels 141 to facilitate mobility. However, the grain bagging apparatus 100 would work with other mobility means, such as a mobile chassis 140 with skis or tracks.

The mobile chassis 140 may have a solid or extendable tongue 142 for coupling to the mover. The mover may be a tractor, truck or other suitable machinery for pulling the grain bagger. Alternatively, the mover may be a self-propelling system coupled to the grain bagging apparatus 100. In another embodiment, the mobile chassis 140 may be pivotally coupled to the tongue 142 for coupling to the mover. The wheels 141 may also be pivotally coupled to the mobile chassis 140. Accordingly, when the grain bagging apparatus 100 is being transported or stored, the mobile chassis 140 can pivot approximately 90 degrees. Pivoting of the mobile chassis 140 approximately 90 degrees allows the grain bagging apparatus 100 to have a narrower profile behind the mover.

In another embodiment, the mobile chassis 140 may have a hydraulic lift system to lift the expandable grain discharge tunnel 130 to a desirable height above the ground. This lift system would assist in loading the grain into the grain bag.

Referring now to FIG. 3, the rear side (i.e., the side where the grain is being loaded into the grain bag) of the grain bagging apparatus 100 in the second position is shown. In FIG. 3, the expandable grain discharge tunnel 130 has been moved into the second position by each flanking side moving in an outwardly direction away from the stationary section.

However, in an alternate embodiment, the expandable grain discharge tunnel 130 may be moved into the second position by only one flanking side moving in an outwardly direction away from the stationary section. Similarly, only one side of the expandable loading tray 190 would move in an outwardly direction away from the stationary portion. In this alternate embodiment, the other, non-moving flanking side and flanking tray portion would be in a fixed position relative to the stationary section and stationary portion, respectively.

Figure 4:
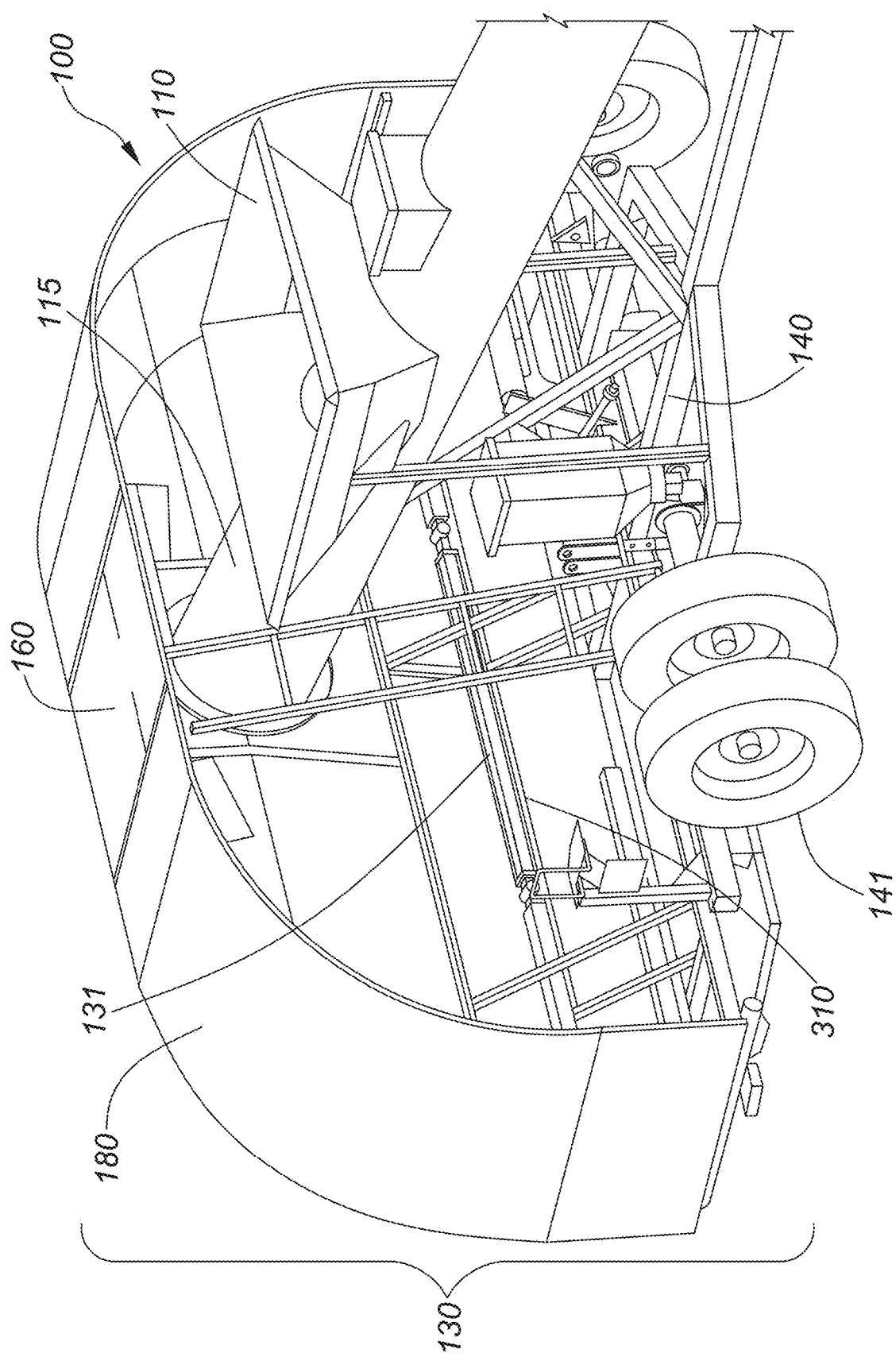
FIG. 4 is a front perspective view of a grain bagging apparatus in a second position according to one aspect of the invention.

The movement of the expandable grain discharge tunnel 130 into the second position (as shown in FIGS. 3 and 4), and the movement of the expandable grain discharge tunnel 130 back to the first position (as shown in FIGS. 1 and 2) is facilitated by a drive means 131. The drive means 131 is for sliding the first flank and/or the second flank such that the expandable grain discharge tunnel 130 moves into the first position or the second position. The drive means 131 may be any manual or mechanical means of moving the first flank and/or the second flank, such as a hydraulic cylinder, electric motor, or power actuated or manual winch.

As can be seen, the flanking frames 180 slide from an overlapping position on a top side of the stationary plate 160 (first position), to a position adjacent to, yet still partially overlapping, the sides of the stationary plate 160 (second position). The flanking shields 170 slide from an overlapping position on a rear side of the stationary shield 150 (first position), to a position adjacent to, yet still partially overlapping, the outward side edges of the stationary shield 150 (second position). For stability, portions of the flanking frames 180 and flanking shields 170 may still overlap the stationary plate 160 and stationary shield 150, respectively, when in the fully expanded position.

The expandable grain discharge tunnel 130 may also have a lift cradle 310 coupled to the rear side of the expandable grain discharge tunnel 130. In a preferred embodiment, the lift cradle 310 is coupled to the stationary shield 150. The lift cradle 310 is used to assist the user in attaching the grain bag onto the expandable grain discharge tunnel 130. The lift cradle 310 is coupled to a lifting means, such as a power actuated or manual winch, electric motor, hydraulic cylinder, or other suitable means for lifting both the lift cradle 310 and the grain bag.

Referring now to FIG. 4, the front side (i.e., the side facing away from the grain being loaded into the grain bag) of the grain bagging apparatus 100 in the second position is shown. As can be seen, the flanking shields 170 have moved in an outwardly direction away from the stationary shield 150. The flanking frames 180 have also moved in an outwardly direction away from the stationary plate 160.

While FIGS. 1 to 4 show the expandable grain discharge tunnel 130 as being comprised of distinct frames and shields, the skilled artisan would understand that these parts may be one integral piece. For example, one flanking side (i.e., a flanking shield 170 and a flanking frame 180) may be integrally formed with the stationary section (i.e., the stationary shield 150 and the stationary plate 160), to form a single stationary piece. In this embodiment, the other flanking side would be slidably coupled to the single, integral piece on one side. Similarly, one flanking portion of the expandable loading tray 190 may be integrally formed with the stationary portion. In this embodiment, the other flanking portion would be slidably coupled to the single, integral loading tray portion. Additionally, the stationary shield 150 and stationary plate 160 (i.e., the stationary section) may form a single integral piece and a flanking shield 170 and a flanking frame 180 (i.e., a flanking side) may form a single integral piece. FIGS. 1 to 4 show flanking frames 180 that have substantially the same width as the stationary plate 160. However, the flanking frames 180 may be narrower or wider than the stationary plate 160.

Referring now to FIG. 5, the rear side (i.e., the side where the grain is being loaded into the grain bag) of a grain bagging apparatus 500 in a second position is shown. The grain bagging apparatus 500 comprises an inlet 510, an outlet 520, an expandable discharge tunnel and a chassis 540. The expandable grain discharge tunnel is comprised of a stationary shield 550, a stationary plate 560, flanking shields 570, and a track 590. The stationary shield 550 is coupled to a stationary framework 551 and the flanking shields 570 are each coupled to a slidable framework 571.

The slidable frameworks 571 are capable of sliding towards the stationary framework 551 (i.e., inwardly with respect to a center of the expandable grain discharge tunnel) to move the expandable grain discharge tunnel into a first position. Furthermore, the slidable frameworks 571 are capable of sliding away from the stationary framework 551 (i.e., outwardly with respect to a center of the expandable grain discharge tunnel) to move the expandable grain discharge into additional expanded positions. The slidable frameworks 571 may slide away from the stationary framework 551 only a portion of the fully expandable width into a second position, to accommodate a grain bag that is larger than the grain bag that can be used with the first position. However, the slidable frameworks 571 may be slide further away from the stationary framework 551 to a third position, to accommodate a grain bag that is larger than the grain bags that can be used with the grain bagging apparatus 500 in either the first or second position. The width of the expandable grain discharge tunnel may be expanded to any position between the first position and the fully expanded position, to accommodate multiple sizes of grain bags. Accordingly, the expandable grain discharge tunnel may be moved into multiple positions (i.e., third, fourth, fifth, etc. positions).

In FIG. 5, the stationary plate 560 is coupled to the top of the stationary shield 550. The stationary plate 560 is supported by support bars 561 coupled to the stationary shield 550. The flanking shields 570 are slidably coupled to the stationary shield 550 on the rear side of the stationary shield 550 by way of the slidable coupling between the slidable frameworks 571 and the stationary framework 551. The slidable frameworks 571 and the stationary framework 551 are coupled to the front side of the flanking shields 570 and the stationary shield 550, respectively. The track 590 facilitates the movement of the flanking shields 570 inwardly or outwardly from the stationary shield 550.

The grain bagging apparatus 500 may have flanking frames (not shown) that cover the top and side edges of the flanking shields 570, to facilitate the fitting and securing of the grain bag around the outer perimeter of the expandable grain discharge tunnel.

The grain bagging apparatus 500 may also have vent holes 572 in each of the flanking shields 570. When the expandable grain discharge tunnel is in the first position, the vent holes 572 align with stationary vent holes 552 on the stationary shield 550. Accordingly, the back shield in the grain bagging apparatus 500 may appear to have only two (2) vent holes 572 when in the first position, and would have two (2) vent holes 572 and two (2) stationary vent holes 552 when in the fully expanded position. In FIG. 5, the width of the right flank has been temporarily expanded further outward from the stationary section than the left flank; accordingly, both the vent hole 572 and stationary vent hole 552 are visible on the right flank. However, the vent hole 572 and stationary vent hole 552 on the left flank are aligned with each other to show only one (1) hole. The vent holes 572 and the stationary vent holes 552 are preferably covered with a screen to prevent a loss of grain, while allowing air to escape.

The grain bagging apparatus 500 may also have a viewing hole 573 in at least one of the flanking shields 570 and the stationary shield 550 to allow the driver to see behind the grain bagging apparatus 500 during transport. The viewing holes 573 may be aligned when the grain bagging apparatus 500 is in the first position. The viewing holes 573 may have a replaceable panel to cover the viewing holes 573 while bagging grain. Alternatively, the viewing holes 573 may be covered with a durable, transparent material, such as glass or an acrylic sheet.

Referring now to FIG. 6, the rear side (i.e., the side where the grain is being loaded into the grain bag) of the grain bagging apparatus 500 in a third position is shown. As can be seen, the flanking shields 570 have been moved in an outwardly direction away from the stationary shield 550 through the slit or gap 562.

Figure 7:
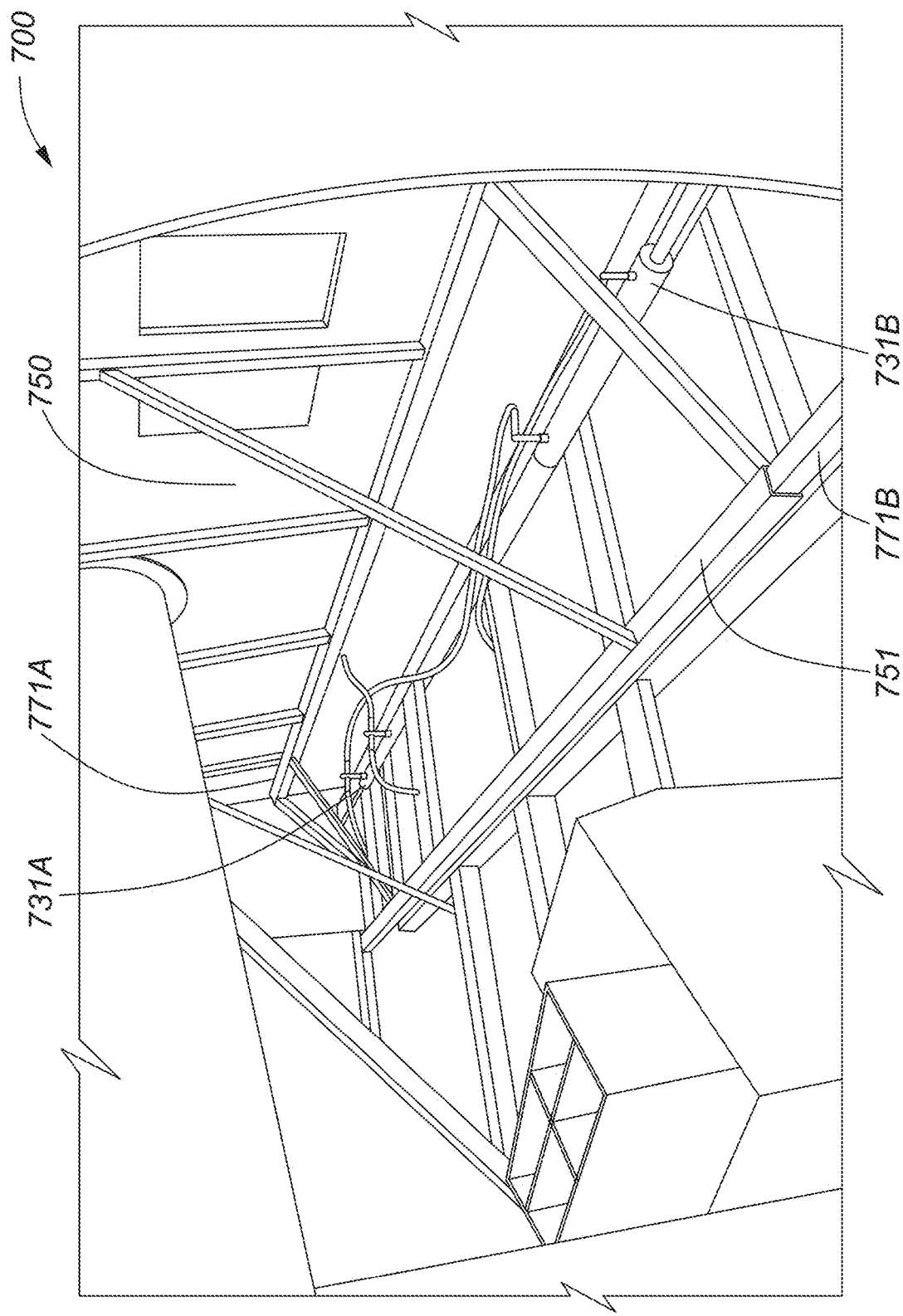
FIG. 7 is a front perspective view of a grain bagging apparatus according to a further aspect of the invention.

Referring now to FIG. 7, the front side (i.e., the side facing away from the grain being loaded into the grain bag) of a grain bagging apparatus 700 in a second position is shown. As can be seen, one end of a first drive means 731A is coupled to a first slidable framework 771A. The first slidable framework 771A is coupled to a first flanking shield. The other end of the first drive means 731A is coupled to the stationary framework 751. The stationary framework 751 is coupled to a stationary shield 750. The first drive means 731A, when actuated, powers the first slidable framework 771A to slide outwardly or inwardly with respect to the stationary framework 751. Accordingly, the first flanking shield slides inwardly or outwardly with respect to the stationary shield 750 with the result that the width of the expandable grain discharge tunnel is contracted or expanded to the first position or the second position, respectively.

Similarly, one end of a second drive means 731B is coupled to a second slidable framework 771B. The second slidable framework 771B is coupled to a second flanking shield. The other end of the second drive means 731B is coupled to the stationary framework 751 on an opposing side to the first drive means 731A. The second drive means 731B, when actuated, powers the second slidable framework 771B to either slide outwardly from the stationary framework 751 in a direction away from the first slidable framework 771B (second position), or inwardly towards the stationary framework 751 (first position). Accordingly, the second flanking shield slides outwardly from the stationary shield 750 in a direction away from the first flanking shield or inwardly towards the stationary shield 750.

Figure 8:
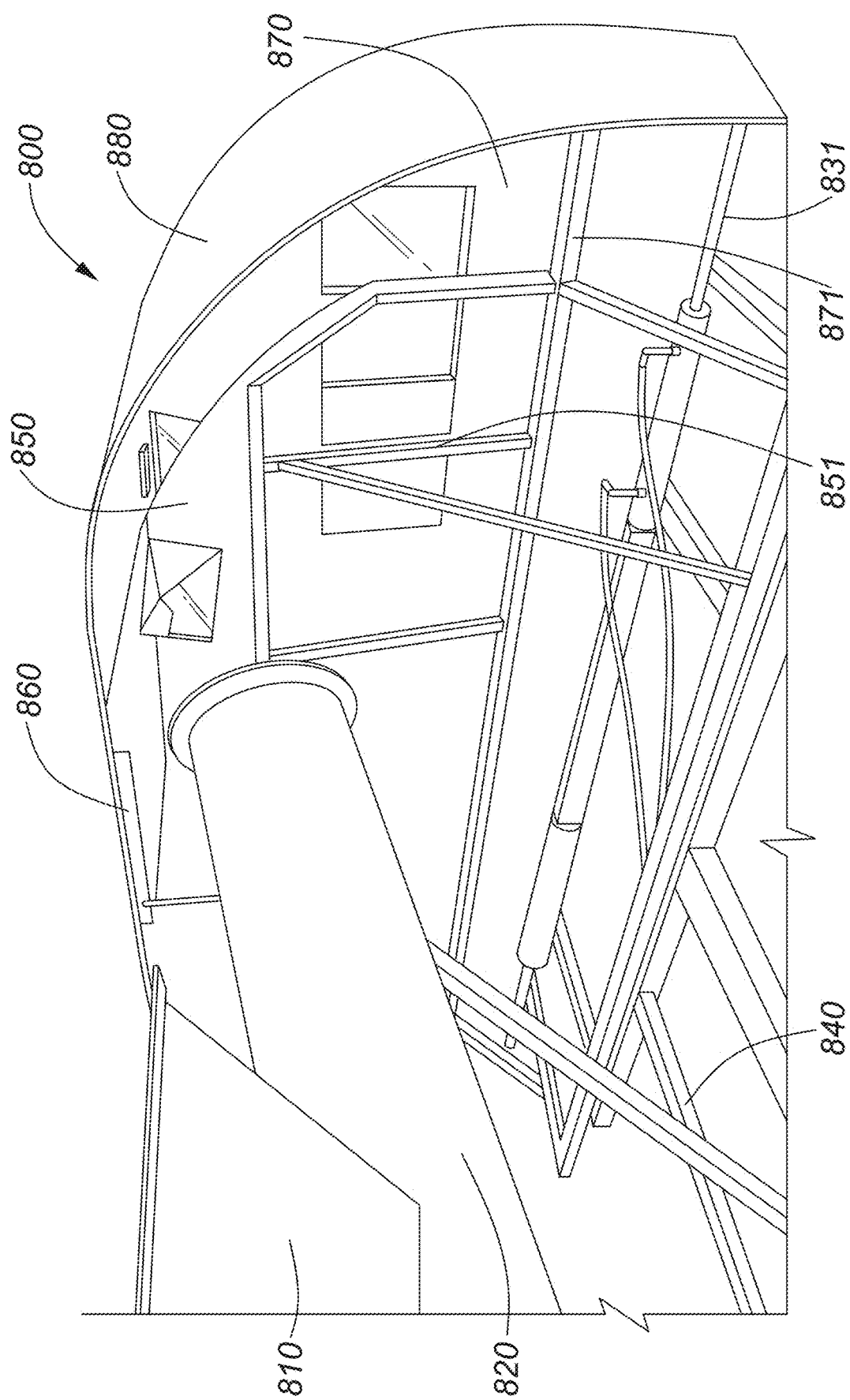
FIG. 8 is a front perspective view of a grain bagging apparatus according to a further aspect of the invention.

Referring now to FIG. 8, the front side of a grain bagging apparatus 800 in a second position is shown. The grain bagging apparatus 800 is comprised of an inlet 810, an outlet 820, an expandable grain discharge tunnel (collectively, a stationary shield 850, a stationary framework 851, a stationary plate 860, a flanking shield 870, a slidable framework 871 and a flanking frame 880), and a chassis 840. The stationary shield 850 is coupled to a stationary framework 851 and the flanking shield 870 is coupled to a slidable framework 871. One end of the drive means 831 is coupled to the stationary framework 851 and the other end of the drive means 831 is coupled to the slidable framework 871. The drive means 831, when actuated, powers the slidable framework 871 to slide outwardly or inwardly with respect to the stationary framework 851. Accordingly, the flanking shield 870 slides inwardly or outwardly with respect to the stationary shield 850 and the width of the expandable grain discharge tunnel is thereby contracted or expanded to the first position or the second position, respectively.

In a preferred embodiment, the width of the expandable grain discharge tunnel in the first position is such that the expandable grain discharge tunnel is capable of receiving a 10-foot grain bag. In another preferred embodiment, the width of the expandable grain discharge tunnel in the second position is such that the expandable grain discharge tunnel is capable of receiving a 12-foot grain bag.

To load the grain bag onto the expandable grain discharge tunnel, the grain bag must be lifted onto the top of the stationary plate 160, 560, or 860 and the top of the flanking frames 180, 580, or 880. This can be done with a loader or with other external lifting means. Alternatively, the grain bag may be placed on the lift cradle 310 and a lifting means can lifts the lift cradle 310 and the grain bag upwards towards the top of the flanking frames 180, 580, or 880 and the top of the stationary plate 160, 560, or 860. The lifting means is coupled to the lift cradle 310 and to the stationary section. The lifting means may be an electric or manual winch or an electric or hydraulic cylinder.

The lift cradle 310 may be pivotally coupled to the stationary shield 150, 550, 750, or 850 such that the lifting means pivots the lifting cradle 310 into a position above and behind the stationary plate 160, 560, or 860 to facilitate the transfer of the grain bag to the grain discharge tunnel. The lift cradle 310 may also become the top portion of the outer perimeter of the expandable grain discharge tunnel (i.e., the top of the grain bag is positioned around the lift cradle 310).

Alternatively, the lifting means lifts the lift cradle 310 to a position that is aligned or essentially aligned with the top of the flanking frames 180, 580, or 880 and stationary plate 160, 560, or 860. Afterwards, to load the grain bag onto the expandable grain discharge tunnel, the user would then manually slide the grain bag off of the lift cradle 310 and onto the top of the flanking frames 180, 580, or 880 and the top of the stationary plate 160, 560, or 860. The remainder of the grain bag is then positioned around the flanking frames 180, 580, or 880.

When the grain bag is loaded onto the expandable grain discharge tunnel, the bottom of the grain bag may be rested against the top of the expandable load tray 190. The bottom of the grain bag may then be positioned inside the expandable loading tray 190. The lifting means of the expandable loading tray 190 may be coupled to the expandable loading tray 190 and the stationary section. The lifting means lifts the expandable loading tray 190 to secure the grain bag around the outer perimeter of the expandable grain discharge tunnel by squeezing the grain bag between the top of the expandable loading tray 190 and a bottom edge of the expandable grain discharge tunnel.

Alternatively, the grain bag may be positioned around the outer perimeter of the expandable grain discharge tunnel in a first position. Once the grain bag has been secured on the expandable grain discharge tunnel, the drive means 131, 731A, 731B, or 831 can then be activated to expand the width of the expandable grain discharge tunnel into the second position. This allows the width of the expandable grain discharge tunnel to expand into the inner circumference of the grain bag and thus the grain bag is secured around the outer perimeter of the expandable grain discharge tunnel.

Once the grain bag has been positioned on the expandable grain discharge tunnel, the grain bag is then secured to the expandable grain discharge tunnel using suitable securing means, such as tie cables or bungee cords. Once the bag is secured to the grain bagging apparatus, the end of the bag can be sealed to prevent grain from leaking out of the end of the grain bag and to avoid moisture from entering the grain bag. Expanding the width of the expandable grain discharge tunnel after the grain bag is in position also allows for easier positioning of the grain bag.

A person understanding this invention may now conceive of alternative structures and embodiments or variations of the above all of which are intended to fall within the scope of the invention as defined in the claims that follow.

What is claimed is:

1. An expandable grain discharge tunnel for a grain bagging apparatus, the expandable grain discharge tunnel comprising:
a stationary section;
a first flank slidably coupled to the stationary section; and
a first drive means having a first end and a second end, the first end of the first drive means being coupled to the first flank and the second end of the drive means being coupled to the stationary section;
wherein the first drive means slidably transitions the expandable grain discharge tunnel from a first position to a second position by sliding the first flank in an outward direction away from the stationary section along a rectilinear path and the first drive means slidably transitions the expandable grain discharge tunnel from the second position to the first position by sliding the first flank in an inward direction towards the stationary section along the rectilinear path; and
wherein the expandable grain discharge tunnel has a wider width in the second position than in the first position, such that differently sized grain bags are mountable with the grain discharge tunnel when the grain discharge tunnel is in different positions.

2. The expandable grain discharge tunnel according to claim 1, wherein the stationary section further comprises a stationary shield and a stationary plate, and the stationary plate is coupled to a top of the stationary shield.

3. The expandable grain discharge tunnel according to claim 1, wherein the first flank further comprises a first shield and a first frame, and the first frame is coupled to a top of the first shield.

4. The expandable grain discharge tunnel according to claim 1, wherein the expandable grain discharge tunnel further comprises a second flank and a second drive means, wherein the second flank is slidably coupled to the stationary section on an opposing side of the stationary section to the first flank and the second drive means is coupled at a first end to the second flank and the second drive means is coupled at a second end to the stationary section at an opposing side of the stationary section to the first drive means.

5. The expandable grain discharge tunnel according to claim 1, wherein the stationary section further comprises a stationary framework coupled to a front side of the stationary section and the first flank further comprises a first slidable framework coupled to a first front side of the first flank, wherein the first flank and the stationary section are slidably coupled to each other by way of the first slidable framework being slidably coupled to the stationary framework.

6. The expandable grain discharge tunnel according to claim 5, wherein the first end of the first drive means is coupled to the first slidable framework and the second end of the first drive means is coupled to the stationary framework.

7. The expandable grain discharge tunnel according to claim 4, wherein the stationary section further comprises a stationary framework coupled to a front side of the stationary section, the first flank further comprising a first slidable framework coupled to a first front side of the first flank and the second flank further comprising a second slidable framework coupled to a second front side of the second flank, and wherein the first flank and the stationary section are slidably coupled to each other by way of the first slidable framework being slidably coupled to the stationary framework, and wherein the second flank and the stationary section are slidably coupled to each other on an opposing side to the first drive means by way of the second slidable framework which is slidably coupled to the stationary framework.

8. The expandable grain discharge tunnel according to claim 7, wherein the first end of the second drive means is coupled to the second slidable framework and the second end of the second drive means is coupled to the stationary framework.

9. The expandable grain discharge tunnel according to claim 1, wherein when the expandable grain discharge tunnel is in the first position, the expandable grain discharge tunnel has a width to accommodate a ten-foot grain bag.

10. The expandable grain discharge tunnel according to claim 1, wherein when the expandable grain discharge tunnel is in the second position, the expandable grain discharge tunnel has a width to accommodate a twelve-foot grain bag.

11. The expandable grain discharge tunnel according to claim 1, wherein the first drive means is a hydraulic cylinder.

12. The expandable grain discharge tunnel according to claim 4, wherein the second drive means is a hydraulic cylinder.

13. The expandable grain discharge tunnel according to claim 1, further comprising an expandable loading tray comprising a first portion and a stationary portion, wherein the first portion is coupled to a bottom edge of the first flank and the stationary portion is coupled to a bottom side of the stationary section, and wherein the first portion is slidably coupled to the stationary portion.

14. The expandable grain discharge tunnel according to claim 4, further comprising an expandable loading tray with a first portion, a second portion, and a stationary portion, wherein the first portion is coupled to a bottom edge of the first flank, the second portion is coupled to a second bottom edge of the second flank, and the stationary portion is coupled to a bottom side of the stationary section, and wherein the first portion is slidably coupled to the stationary portion and the second portion is slidably coupled to the stationary portion on an opposite side of the expandable loading tray to the first portion.

15. The expandable grain discharge tunnel according to claim 1, wherein the expandable grain discharge tunnel is slidably adjustable to accommodate a plurality of sizes of grain bags, such that the second position of the expandable grain discharge tunnel is a partially expanded position and the first flank is slidably movable by the first drive means in an outward direction away from the stationary section along the rectilinear path to thereby transition the expandable discharge tunnel from the second position to at least one additional position.

16. The expandable grain discharge tunnel according to claim 4, wherein the expandable grain discharge tunnel is slidably adjustable to accommodate a plurality of sizes of grain bags, such that the second position of the expandable grain discharge tunnel is a partially expanded position and the expandable discharge tunnel is slidably transitioned from the second position to at least one additional position by the first drive means slidably moving the first flank in a first outward direction away from the stationary section along the rectilinear path and by the second drive means slidably moving the second flank in a second outward direction away from the stationary section along the rectilinear path, wherein the first outward direction is opposite the second outward direction.

17. The expandable grain discharge tunnel according to claim 1, wherein the stationary section is coupled to a rectilinear track and the first flank is slidably coupled to the rectilinear track, such that the first flank slides along the rectilinear track when the expandable grain discharge tunnel slidably transitions between the first position and the second position, and such that the first flank overlaps the stationary section when the expandable grain discharge tunnel is in the first position.

18. A grain bagging apparatus for loading grain into a grain bag for storage, the grain bagging apparatus comprising an expandable grain discharge tunnel having:
   a stationary section;
   a first flank slidably coupled to the stationary section; and
   a first drive means having a first end and a second end, the first end of the first drive means being coupled to the first flank and the second end of the drive means being coupled to the stationary section;
wherein the first drive means slidably transitions the expandable grain discharge tunnel from a first position to a second position by sliding the first flank in an outward direction away from the stationary section along a rectilinear path and the first drive means slidably transitions the expandable grain discharge tunnel from the second position to the first position by sliding the first flank in an inward direction towards the stationary section along the rectilinear path; and
wherein the expandable grain discharge tunnel has a wider width in the second position than in the first position such that differently sized grain bags are mountable on the grain discharge tunnel.

19. The grain bagging apparatus according to claim 18, wherein the expandable grain discharge tunnel further comprises a second flank and a second drive means, wherein the second flank is slidably coupled to the stationary section on an opposing side of the stationary section to the first flank and the second drive means is coupled at one end to the second flank and the second drive means is coupled at another end to the opposing side of the stationary section to the first drive means.

20. The grain bagging apparatus according to claim 18, wherein the first drive means is a hydraulic cylinder.

21. The grain bagging apparatus according to claim 19, wherein the first drive means is a hydraulic cylinder.

22. The grain bagging apparatus according to claim 18, wherein the stationary section is coupled to a rectilinear track and the first flank is slidably coupled to the rectilinear track, such that the first flank slides along the rectilinear track when the expandable grain discharge tunnel slidably transitions between the first position and the second position, and such that the first flank overlaps the stationary section when the expandable grain discharge tunnel is in the first position.

23. A method of loading a grain bag on a grain bagging apparatus having an expandable grain discharge tunnel, the method comprising the steps of:
   providing the grain bagging apparatus, the grain bagging apparatus having the expandable grain discharge tunnel, the expandable grain discharge tunnel having a stationary section and at least one flank and the expandable grain discharge tunnel being configured to have a first position and a second position and the expandable grain discharge tunnel being configured to slidably transition from the first position to the second position by sliding the at least one flank in an outward direction away from the stationary section along a rectilinear path, the grain discharge tunnel having a larger width in the second position than in the first position;
   securing the grain bag on the expandable grain discharge tunnel while the tunnel is in the first position; and
   slidably transitioning the expandable grain discharge tunnel from the first position to the second position along the rectilinear path to thereby secure the grain bag around an outer perimeter of the expandable grain discharge tunnel.

24. The method of bagging grain according to claim 23, wherein the expandable grain discharge tunnel is slidably transitioned from the first position to the second position using a hydraulic cylinder.

25. The method according to claim 23, wherein the stationary section is coupled to a rectilinear track and the at least one flank is slidably coupled to the rectilinear track, such that the at least one flank slides along the rectilinear track when the expandable grain discharge tunnel slidably transitions between the first position and the second position, and such that the at least one flank overlaps the stationary section when the expandable grain discharge tunnel is in the first position.

* * * * *